(12) United States Patent
Teraoka et al.

(10) Patent No.: US 9,831,524 B2
(45) Date of Patent: Nov. 28, 2017

(54) MANUFACTURING METHOD OF ELECTRODE ASSEMBLY, ELECTRODE ASSEMBLY, AND BATTERY

(71) Applicant: SEIKO EPSON CORPORATION, Tokyo (JP)

(72) Inventors: Tsutomu Teraoka, Matsumoto (JP); Tomofumi Yokoyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 381 days.

(21) Appl. No.: 14/606,473

(22) Filed: Jan. 27, 2015

(65) Prior Publication Data
US 2015/0221979 A1  Aug. 6, 2015

(30) Foreign Application Priority Data
Jan. 31, 2014  (JP) ................. 2014-016850

(51) Int. Cl.
*H01M 6/00* (2006.01)
*H01M 10/0562* (2010.01)
(Continued)

(52) U.S. Cl.
CPC ..... *H01M 10/0562* (2013.01); *H01M 4/0407* (2013.01); *H01M 4/0416* (2013.01);
(Continued)

(58) Field of Classification Search
CPC .. H01M 4/0407; H01M 4/0471; H01M 4/131; H01M 4/1391; H01M 4/366;
(Continued)

(56) References Cited

U.S. PATENT DOCUMENTS

2004/0096745 A1  5/2004  Shibano et al.
2009/0081554 A1  3/2009  Takada et al.
(Continued)

FOREIGN PATENT DOCUMENTS

JP  2003-346895 A  12/2003
JP  2004-179158 A  6/2004
(Continued)

OTHER PUBLICATIONS

Du et al., "Structure and Lithium Ion Diffusion in Lithium Silicate Glasses and at their Interfaces with Lithium Lanthanum Titanate Crystals," Journal of Non-Crystalline Solids, 2012, vol. 358, pp. 3531-3538.

(Continued)

*Primary Examiner* — Raymond Alejandro
(74) *Attorney, Agent, or Firm* — Oliff PLC

(57) ABSTRACT

A manufacturing method of an electrode assembly includes: forming an active material compact containing a lithium double oxide and having a plurality of voids; forming a first solid electrolyte in the plurality of voids; impregnating a precursor solution of a second amorphous solid electrolyte conducting lithium ions with an active material compact in which the first solid electrolyte is formed; and performing heat treatment of the active material compact with which the precursor solution is impregnated and forming a second solid electrolyte in the plurality of voids.

15 Claims, 5 Drawing Sheets

(51) Int. Cl.
    *H01M 4/131* (2010.01)
    *H01M 4/1391* (2010.01)
    *H01M 4/36* (2006.01)
    *H01M 10/052* (2010.01)
    *H01M 4/04* (2006.01)
    *H01M 4/485* (2010.01)
    *H01M 4/525* (2010.01)
    *H01M 10/0525* (2010.01)

(52) U.S. Cl.
    CPC ......... *H01M 4/0471* (2013.01); *H01M 4/131* (2013.01); *H01M 4/1391* (2013.01); *H01M 4/366* (2013.01); *H01M 4/485* (2013.01); *H01M 4/525* (2013.01); *H01M 10/052* (2013.01); *H01M 10/0525* (2013.01); *H01M 2300/0068* (2013.01)

(58) Field of Classification Search
    CPC ............... H01M 4/485; H01M 10/052; H01M 10/0562; H01M 10/0525; H01M 2300/0068; Y02E 60/122
    See application file for complete search history.

(56) References Cited

U.S. PATENT DOCUMENTS

| | | | |
|---|---|---|---|
| 2010/0051856 A1 | 3/2010 | Kim et al. | |
| 2011/0059369 A1 | 3/2011 | Nan et al. | |
| 2013/0177798 A1* | 7/2013 | Ueda | H01M 10/052 429/127 |
| 2014/0065489 A1* | 3/2014 | Saimen | H01M 4/622 429/303 |

FOREIGN PATENT DOCUMENTS

| | | |
|---|---|---|
| JP | 2006-277997 A | 10/2006 |
| JP | 2010-056087 A | 3/2010 |
| JP | 4615339 B2 | 1/2011 |
| JP | 2014-154238 A | 8/2014 |
| WO | 2007/004590 A1 | 1/2007 |
| WO | 2013/130983 A2 | 9/2013 |

OTHER PUBLICATIONS

Jun. 26, 2015 Extended Search Report issued in European Application No. 15153027.6.

Sep. 1, 2016 Extended Search Report issued in European Patent Application No. 16171292.2.

\* cited by examiner

MANUFACTURING METHOD OF ELECTRODE ASSEMBLY, ELECTRODE ASSEMBLY, AND BATTERY

This application claims a priority to Japanese Patent Application No. 2014-016850 filed on Jan. 31, 2014 which is hereby expressly incorporated by reference in its entirety.

BACKGROUND

1. Technical Field

Several aspects of the present invention relate to a manufacturing method of an electrode assembly, an electrode assembly, and a battery.

2. Related Art

A lithium battery using lithium or a lithium-containing material for a negative electrode has a light weight and large capacity, and a high voltage can be obtained by suitably combining with a positive electrode. Accordingly, the lithium battery is widely used as a battery for a mobile electronic apparatus, a camera, a clock, an electric tool, and a hybrid automobile. However, generally, lithium has high activity and an organic electrolytic solution is used in the lithium battery, and accordingly, ignition or explosion may occur on the occurrence of a short circuit. Therefore, it is important to ensure safety in the design of the lithium battery.

As one of methods for improving the safety, the electrolytic solution may not be used (de-electrolytic solution). As an example of the de-electrolytic solution, a lithium polymer battery using a gel polymer electrolyte has been developed. However, since the gel polymer electrolyte is obtained by impregnating polymer gel with an organic electrolyte, the problem of the ignition or the explosion still remains.

As another example of the de-electrolytic solution, a lithium battery using a ceramic electrolyte (inorganic solid electrolyte) has been developed (for example, see JP-A-2006-277997, JP-A-2004-179158, and Japanese Patent No. 4615339). When the ceramic electrolyte is used, ions moving in the electrolyte due to a cell reaction are only lithium ions, and accordingly, a side reaction substantially does not occur. In addition, since a combustible organic solution is not used, it is not necessary to use a sealing member or a liquid sealing structure, and thus it is possible to further realize miniaturization and thin thickness.

In the technology disclosed in JP-A-2006-277997, contact in a boundary of ceramic electrolyte powder and an electrode active material or a boundary of the ceramic electrolyte powder and the ceramic electrolyte powder may not be sufficient, and excellent battery output may not be obtained. In addition, the boundary contact may be unstable due to a change in volume accompanied with a charge-discharge cycle, and therefore, a cycle life may be shortened.

In the technology disclosed in JP-A-2004-179158, it is difficult to manufacture a battery having sufficient capacity. In order to obtain the sufficient capacity for a battery, it is necessary to manufacture a battery having a total thickness of an active material exceeding 100 μm, but it is difficult to manufacture a battery having the thickness thereof exceeding 100 μm, in the technology disclosed in JP-A-2004-179158.

In the technology disclosed in Japanese Patent No. 4615339, solid phase diffusion of $Li_{0.35}La_{0.55}TiO_3$ which is a solid electrolyte and $LiCoO_2$ which is a battery active material is performed in a manufacturing step, and electrical characteristics may decrease.

SUMMARY

An advantage of some aspects of the invention is to provide a lithium battery which is safer, obtains a sufficient output and has large capacity, and a manufacturing method of this lithium battery.

An aspect of the invention provides a manufacturing method of an electrode assembly including: forming an active material compact containing a lithium double oxide and having a plurality of voids; forming a first solid electrolyte in the plurality of voids; impregnating a precursor solution of a second amorphous solid electrolyte conducting lithium ions with an active material compact in which the first solid electrolyte is formed; and performing heat treatment of the active material compact where the precursor solution is impregnated and forming a second solid electrolyte in the plurality of voids.

According to the manufacturing method, it is possible to manufacture a lithium battery which is safer, obtains a sufficient output and has large capacity.

A process temperature of the heat treatment may be in a range of 300° C. to 450° C.

The second solid electrolyte may contain the lithium double oxide containing Si or B.

The second solid electrolyte may contain at least one of $Li_2SiO_3$ and $Li_6SiO_5$.

The active material compact may contain $LiCoO_2$.

The first solid electrolyte may contain $Li_{0.35}La_{0.55}TiO_3$.

Another aspect of the invention provides an electrode assembly including: an active material compact containing a lithium double oxide; a first solid electrolyte; and a second amorphous solid electrolyte conducting lithium ions, in which the first solid electrolyte and the second solid electrolyte are formed in void portions of the active material compact.

According to the electrode assembly, it is possible to manufacture a lithium battery which is safer, obtains a sufficient output and has large capacity.

Still another aspect of the invention provides a battery including: the electrode assembly according to the aspect described above.

According to the battery, safer and a sufficient output is obtained and large capacity can be realized.

BRIEF DESCRIPTION OF THE DRAWINGS

The invention will be described with reference to the accompanying drawings, wherein like numbers reference like elements.

DESCRIPTION OF EXEMPLARY EMBODIMENTS

1. Structure

Figure 1:
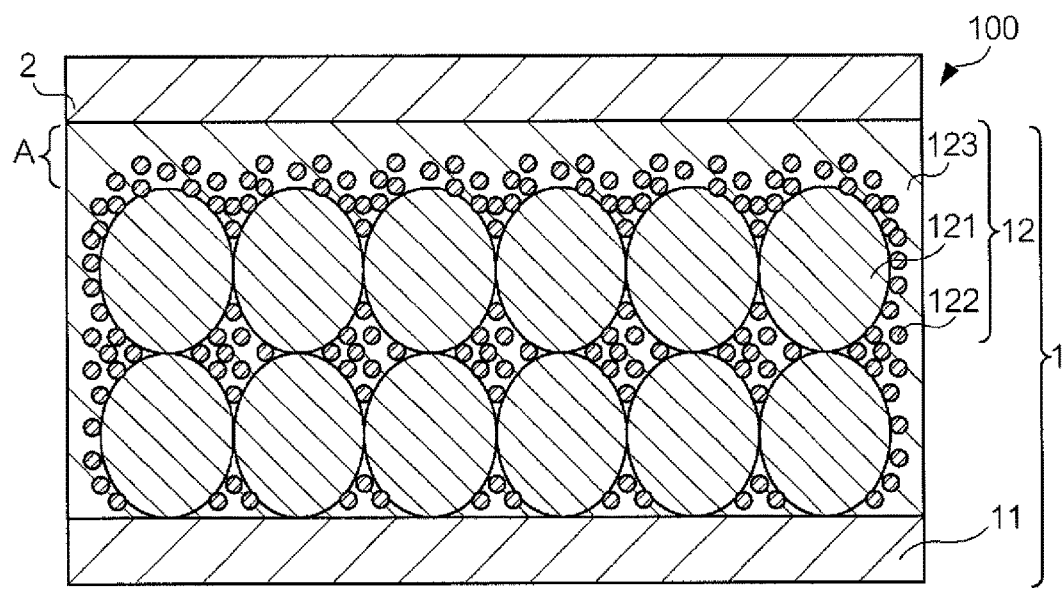
FIG. 1 is a schematic cross-sectional view showing a structure of a lithium battery according to one embodiment.

FIG. 1 is a schematic cross-sectional view showing a structure of a lithium battery 100 according to one embodiment. The lithium battery 100 includes an electrode assembly 1 and an electrode 2. The electrode assembly 1 functions as a positive electrode or a negative electrode according to an active material in use. The electrode 2 is an electrode having a polarity reverse to that of the electrode assembly 1. The lithium battery 100 is a so-called all solid lithium secondary battery. The lithium battery 100 may be used as a primary battery.

The electrode assembly 1 includes a collector 11 and an assembly 12. The assembly 12 includes active material compacts 121, solid electrolytes 122, and solid electrolytes 123. FIG. 1 schematically shows the structure of the lithium battery 100, and shapes and sizes of the active material compacts 121, the solid electrolytes 122, and the solid electrolytes 123 are merely schematically shown.

The collector 11 is an electrode for extracting current generated due to a cell reaction. The collector 11 is provided on one surface of the assembly 12. The active material compact 121 is exposed to this surface. That is, the collector 11 comes in contact with the active material compact 121. The collector 11 is formed of one kind of simple metal material selected from a group consisting of copper (Cu), magnesium (Mg), titanium (Ti), iron (Fe), cobalt (Co), nickel (Ni), zinc (Zn), aluminum (Al), germanium (Ge), indium (In), gold (Au), platinum (Pt), silver (Ag), and palladium (Pd), or an alloy containing two or more kinds of metals selected from this group. The collector 11 is, for example, formed in a plate, foil, or net shape. The surface of the collector 11 may be flat and smooth or irregularities may be formed thereon.

The active material compact 121 is a compact including an electrode active material. The active material compact 121 is porous and includes a plurality of voids (pores) therein. The voids communicate with each other in the active material compact 121. An inorganic material is used as the electrode active material. The collector 11 can be the positive electrode or the negative electrode depending on the material used in the active material compact 121.

When the collector 11 is used on the positive electrode side, a lithium double oxide is, for example, used as the material of the active material compact 121. The "lithium double oxide" herein is an oxide containing two or more kinds of metal including lithium, and refers a material which is not oxoacid. Examples of the lithium double oxide include $LiCoO_2$, $LiNiO_2$, $LiMn_2O_4$, $Li_2Mn_2O_3$, $LiFePO_4$, $Li_2FeP_2O_7$, $LiMnPO_4$, $LiFeBO_3$, $Li_3V_2(PO_4)_3$, $Li_2CuO_2$, $Li_2FeSiO_4$, and $Li_2MnSiO_4$. In addition to the lithium double oxide, a lithium double fluoride such as $LiFeF_3$ may be used. Herein, the lithium double oxide (and lithium double fluoride) in which some atoms in crystal are substituted with other transition metals, typical metals, alkali metals, alkali rare earth elements, lanthanide, chalcogenide, or halogen is also included in the lithium double oxide (and lithium double fluoride). The solid solution thereof may be used as the positive electrode active material.

When the collector 11 is used on the negative electrode side, the lithium double oxide such as $Li_4Ti_5O_{12}$ or $Li_2Ti_3O_7$ is used, as the material of the active material compact 121, for example.

In order to enlarge a contact area of the active material compact 121 and the solid electrolyte 122, porosity of the active material compact 121 is preferably from 10% to 50% and more preferably from 30% to 50%. Since the contact area of the active material compact 121 and the solid electrolyte 122 is enlarged, it is possible to further increase the capacity of the lithium battery 100.

The porosity rv is calculated by the following equation (1).

$$r_v = \left(1 - \frac{m}{Vg \cdot \rho}\right) \times 100 \qquad (1)$$

Herein, vg represents apparent volume of the active material compact 121. The apparent volume is calculated from external dimensions of the active material compact 121 and includes the voids. m represents mass of the active material compact 121, and ρ represents density of the active materials respectively configuring the active material compact 121. Although this will be described later in detail, the porosity of the active material compact 121 can be controlled using a pore forming material in a step of forming the active material compact 121.

In order to increase the output of the lithium battery 100, resistivity of the active material compact 121 is preferably equal to or less than 700 Ω/cm. The resistivity is, for example, obtained by DC polarization measurement. In the DC polarization measurement, copper foil is bonded to the surface of the active material compact 121, for example, and this copper foil is used as an electrode.

The voids of the active material compact 121 are filled with the solid electrolytes 122 and the solid electrolytes 123. A high filling ratio of the solid electrolytes 122 and the solid electrolytes 123 to the voids of the active material compact 121 is preferable, and is from 60% to 90%, for example.

As the solid electrolytes 122, oxide, sulfide, halide, or nitride is used, for example. Specifically, as the solid electrolytes, at least one of $SiO_2$—$P_2O_5$—$Li_2O$, $SiO_2$—$P_2O_5$—LiCl, $Li_2O$—LiCl—$B_2O_3$, $Li_{3.4}V_{0.6}Si_{0.4}O_4$, $Li_{14}ZnGe_4O_{16}$, $Li_{3.6}V_{0.4}Ge_{0.6}O_4$, $Li_{1.3}Ti_{1.7}Al_{0.3}(PO_4)_3$, $Li_{2.88}PO_{3.73}N_{0.14}$, $LiNbO_3$, $Li_{0.35}La_{0.55}TiO_3$, $Li_7La_3Zr_2O_{12}$, $Li_2S$—$SiS_2$, $Li_2S$—$SiS_2$—LiI, $Li_2S$—$SiS_2$—$P_2S_5$, LiPON, $Li_3N$, LiI, LiI—$CaI_2$, LiI—CaO, $LiAlCl_4$, $LiAlF_4$, LiI—$Al_2O_3$, $LiFAl_2O_3$, LiBr—$Al_2O_3$, $Li_2$—$TiO_2$, $La_2O_3$—$Li_2O$—$TiO_2$, $Li_3N$, $Li_3NI_2$, $Li_3N$—LiI—LiOH, $Li_3N$—LiCl, $Li_6NBr_3$, $LiSO_4$, $Li_4SiO_4$, $Li_3PO_4$—$Li_4SiO_4$, $Li_4GeO_4$—$Li_3VO_4$, $Li_4SiO_4$—$Li_3VO_4$, $Li_4GeO_4$—$Zn_2GeO_2$, $Li_4SiO_4$—$LiMoO_4$, $Li_3PO_4$—$Li_4SiO_4$, and $LiSiO_4$—$Li_4ZrO_4$ are used. The solid electrolyte may be a crystalline substance or an amorphous substance. The solid solution in which some atoms in the substances are substituted with other transition metals, typical metals, alkali metals, alkali rare earth elements, lanthanide, chalcogenide, or halogen may be used as the solid electrolyte.

In order to increase the capacity of the lithium battery 100, ion conductivity of the solid electrolyte 122 is preferably equal to or greater than $1\times10^{-5}$ S/cm. When the ion conductivity is low, only the active material on the periphery of the surface of the active material compact 121 is contributed to the cell reaction, and the ions of the solid electrolyte 122 are not efficiently used, and accordingly, the capacity of the lithium battery 100 is not increased. When the ion conductivity is high, even the ions contained in the solid electrolyte 122 in a position separated from the surface of the active material compact 121 reach the surface of the active material compact 121 and are contributed to the cell reaction. That is, it is possible to improve a coefficient of use of the active material of the active material compact 121 and to increase the capacity of the lithium battery 100.

Herein, the ion conductivity of the solid electrolyte 122 is total ion conductivity which is the sum of bulk conductivity which is conductivity of the inorganic electrolytes and particle boundary ion conductivity which is conductivity between crystal particles in a case where the inorganic electrolytes are crystalline substances.

The ion conductivity of the solid electrolyte 122 is, for example, measured by an AC impedance method. The measurement is performed using a sample which is obtained by forming electrodes on both surfaces of the solid electrolyte formed in a predetermined shape (for example, a tablet shape), for example. More specifically, the solid electrolyte powder is subjected to press molding in a tablet shape at 624 MPa. The press-molded body is sintered at 700° C. for 8 hours in the atmosphere. A metal (for example, platinum) having a predetermined shape (for example, a circle having a diameter of 0.5 cm and a thickness of 100 nm) is formed on the sintered body by sputtering. The measurement is performed using an impedance analyzer (SI1260 manufactured by Solartron).

The solid electrolyte 123 is formed of a material which conducts the lithium ions and is amorphous (glassy) at a room temperature. The solid electrolyte 123 is formed of a lithium double oxide containing Si or B, for example. Specifically, the solid electrolyte 123 contains at least one of $Li_2SiO_3$ and $Li_6SiO_5$.

A thickness of the assembly 12 is designed according to the capacity of the lithium battery 100. The thickness of the assembly 12 is, for example, 80 μm to 300 μm and is preferably equal to or greater than 100 μm. The assembly 12 includes an area not containing the active material compact 121 on the opposite side of the collector 11 (area A of FIG. 1). That is, when a side where the assembly 12 is formed is set as up when seen from the collector 11, a surface on the upper side of the solid electrolyte 122 is positioned on the upper portion with respect to an upper end position of the active material compact 121. By providing the area not containing the active material compact 121 as described above, when the electrode is provided on the surface, it is possible to prevent short circuit of the electrode and the collector 11 through the active material compact 121.

The active material compact 121 is exposed in the surface of the assembly 12 which comes in contact with the collector 11, from the solid electrolyte 122. The exposure of the active material compact 121 may be performed by polishing the solid electrolyte 122.

The electrode assembly 1 is formed without using an organic material such as a binder for binding the active materials to each other or a conductive assistant for maintaining the conductivity of the active material compact 121, and is substantially only configured with the inorganic material. Specifically, in the electrode assembly 1 of the embodiment, a mass decrease ratio when heating the assembly 12 (the active material compact 121, the solid electrolytes 122, and the solid electrolytes 123) at 400° C. for 30 minutes, is equal to or smaller than 5% by mass. The mass decrease ratio is preferably equal to or smaller than 3% by mass and more preferably equal to or smaller than 1% by mass, and it is particularly preferable that the mass decrease not be observed or the mass decrease ratio be in an error range.

The mass decrease ratio of the assembly 12 is measured using a simultaneous measurement device for differential thermal-thermogravimetry (TG-DTA). The assembly 12 is heated in predetermined heating conditions and the mass of the heated assembly 12 is measured. It is possible to calculate the mass decrease ratio from a ratio of the mass before and after the heating.

In the active material compact 121, the plurality of voids communicate with each other therein in a net shape. For example, $LiCoO_2$ as an example of the positive electrode active material has been known to have anisotropy to the electron conductivity of the crystal. Accordingly, when the voids extend in a specific direction, it may be difficult for the electron conduction to be performed, depending on a relationship between the direction in which the voids extend and a crystal orientation. However, when the voids communicate with each other in a net shape, the active materials are also connected to each other isotropically, and therefore, it is possible to form an electrochemically smooth continuous surface. Thus, it is possible to obtain the excellent electron conduction, compared to a case where the voids are anisotropically formed.

The active material compact 121 includes the plurality of voids therein and has a large surface area. Accordingly, a contact area of the active material compact 121 and a solid electrolyte layer 123 increases, and it is possible to decrease an interfacial impedance. In the electrode assembly 1, the contact area of the active material compact 121 and the solid electrolyte layer 123 is greater than a contact area of the collector 11 and the active material compact 121. Charge transfer is easily performed in the boundary of the collector 11 and the active material compact 121, compared to the boundary of the active material compact 121 and the solid electrolyte layer 123, and accordingly, when the contact areas have the same size, the boundary of the active material compact 121 and the solid electrolyte layer 123 may be a bottleneck of the charge transfer. However, when the contact area of the active material compact 121 and the solid electrolyte layer 123 is greater than the contact area of the collector and the active material compact, this problem regarding the bottleneck is easily solved.

When the active material compact 121 is formed of the positive electrode active material, the collector 11 is formed of aluminum, for example. The electrode 2 is formed of a material functioning as the negative electrode, for example, lithium.

2. Manufacturing Method

Figure 2:
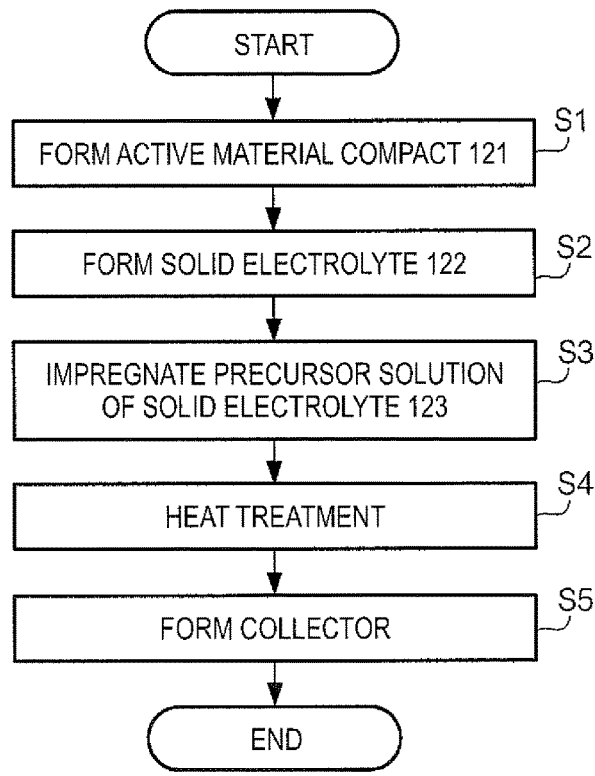
FIG. 2 is a flowchart showing a manufacturing method of an electrode assembly.

FIG. 2 is a flowchart showing a manufacturing method of the electrode assembly 1. FIG. 3 to FIG. 6 are schematic views showing states after each step.

In Step S1, the active material compact 121 is formed. Specific description is as follows. First, particles (powder) of the active material (lithium double oxide) are prepared. An average particle diameter (D50) of the active material is, for example, preferably from 300 nm to 5 μm and more preferably from 2 μm to 5 μm. The average particle diameter is measured using a light-scattering type particle size distribution-measuring device (for example, Nanotrac UPA-FX250 manufactured by Nikkiso Co., Ltd.), after dispersing the particles of the active material in n-octanol to have a concentration of 0.1% by mass to 10% by mass, for example. When the average particle diameter is excessively small, the size of the void is decreased, and it is difficult to perform the filling with the electrolytes. In contrast, when the average particle diameter is excessively large, the size of the surface area of the active material compact 121 is decreased, and the output of the lithium battery 100 is decreased.

Figure 3:
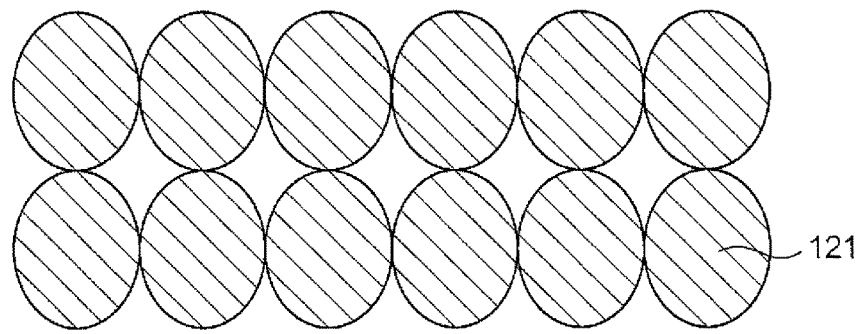
FIG. 3 is a schematic view showing a state after Step S1.

Next, the active material is put in a mold and subjected to compression molding. In addition, this compressed body is subjected to heat treatment and sintering, and the active material compact 121 is obtained (FIG. 3). The heat treatment is performed with the temperature condition which is at a temperature equal to or higher than 850° C. and at a temperature lower than the lower temperature of a melting point and a decomposition point of the lithium double oxide used as the active material. For example, this heat treatment is preferably performed at a temperature of 875° C. to 1000° C. and more preferably performed at a temperature of 900° C. to 920° C. In addition, this heat treatment is preferably performed for 5 minutes to 36 hours and more preferably performed for 4 hours to 14 hours.

A polymer compound functioning as a binder may be added to the active material. As the polymer compound, polyvinylidene fluoride (PVdF) or polyvinyl alcohol (PVA) is used, for example. The polymer compound is burnt or oxidized in the heat treatment of this step, to reduce the amount thereof.

In addition, a pore forming material may be added to the active material. The pore forming material is a material to be a mold of the void (for example, polymer compound or carbon powder). By adding the pore forming material, it is possible to control the porosity of the active material compact 121. The pore forming material is burnt or oxidized in the heat treatment of this step, to reduce the amount thereof. The average particle diameter of the pore forming material is preferably from 0.5 µm to 10 µm. The pore forming material may contain particles formed with a material having deliquescency. Water generated in the vicinity thereof due to the deliquescence functions as a binder which connects the particulate lithium double oxide to each other. Accordingly, it is possible to maintain a shape of a compression body while performing the compression mold and the heat treatment of the particulate active material.

In Step S2, the solid electrolytes 122 are formed in the voids of the active material compacts 121. Specific description is as follows. First, a precursor of the solid electrolyte 122 is prepared. As the precursor, any one of the following (A) to (C) is used, for example.

(A) Composition containing metal atoms at a ratio according to a composition of the solid electrolyte 122 and including salt to be the solid electrolyte 122 due to oxidization (B) Composition including metal alkoxide containing metal atoms at a ratio according to a composition of the solid electrolyte 122

(C) Dispersion obtained by dispersing solid electrolyte fine particles and sol of fine particles containing metal atoms at a ratio according to a composition of the solid electrolyte 122 in a solvent or in (A) or (B)

A metal complex is contained in the salt contained in (A). (B) is a precursor in a case of forming the solid electrolyte using a so-called sol-gel method. Herein, each of these precursors is diluted with a solvent to be used as a precursor solution.

Figure 4A:
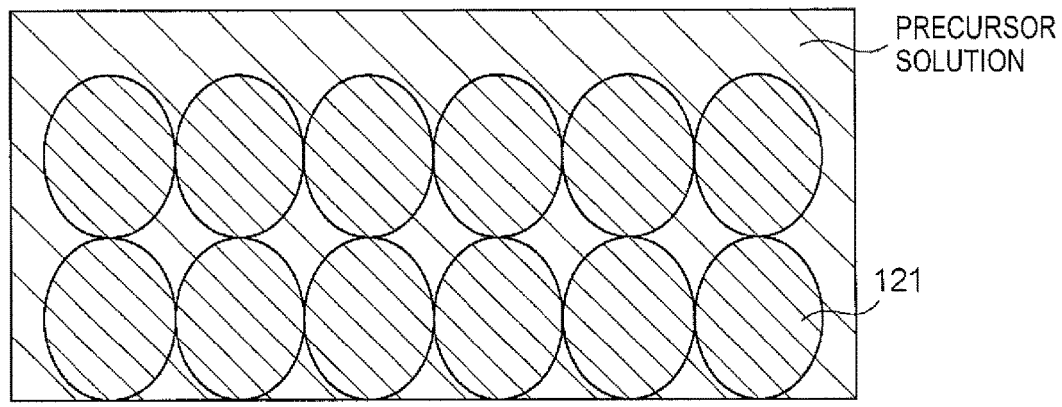
FIGS. 4A and 4B are schematic views showing a state after Step S2.

Next, the precursor solution is impregnated with the voids of the active material compact 121. Specifically, the precursor solution is added dropwise onto the active material compact 121, for example, (FIG. 4A). Alternatively, the active material compact 121 may be immersed in the precursor solution. As another example, the precursor solution may be coated on the active material compact 121. As still another example, the precursor solution may come in contact with the end portion of the active material compact 121 and the precursor solution may be impregnated with the voids of the active material compact 121 using capillarity. At that time, the impregnation of the precursor solution may be promoted by pressurizing the atmosphere surrounding the active material compact 121 or the precursor.

Figure 4B:
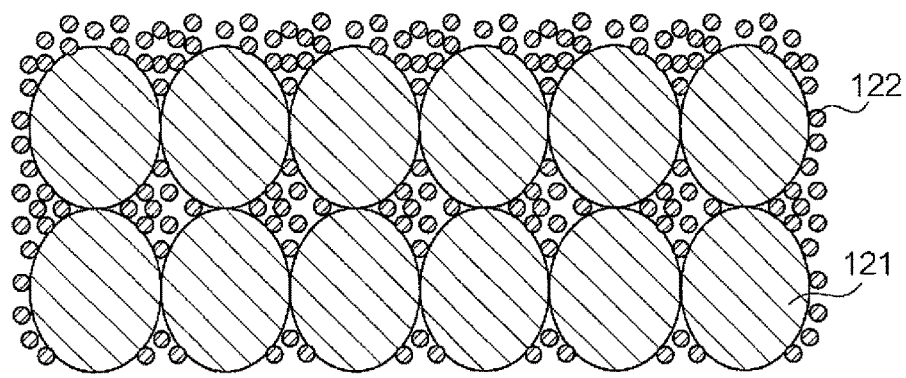

Next, the precursor is fired and the solid electrolytes 122 are obtained (FIG. 4B). Before the firing, the solvent may be removed. The removal of the solvent is performed using at least one of well-known methods of heating, decompression, and ventilation. The firing of the precursor is performed at a temperature lower than the temperature of the heat treatment for obtaining the active material compact 121 in the atmosphere. The firing temperature is in a temperature range of 300° C. to 700° C. When the firing temperature is excessively high, an electrochemically inactive byproduct may be generated due to a solid phase reaction in the boundary of the active material compact 121 and the solid electrolyte layer 123. The byproduct applies a negative effect to the characteristics of the lithium battery 100. When the firing temperature is excessively low, crystallinity of the solid electrolyte 122 may be deteriorated and the sufficient ion conductivity may not be obtained.

The solid electrolytes 122 are formed by a method of impregnating the precursor solution having fluidity with the voids of the active material compacts 121. However, since the precursor solution is not impregnated with all of the voids and the volume thereof is contracted in a process of firing the precursor solution, the voids remain in the assembly of the active material compacts 121 and the solid electrolytes 122, after the solid electrolytes 122 are formed.

Figure 5:
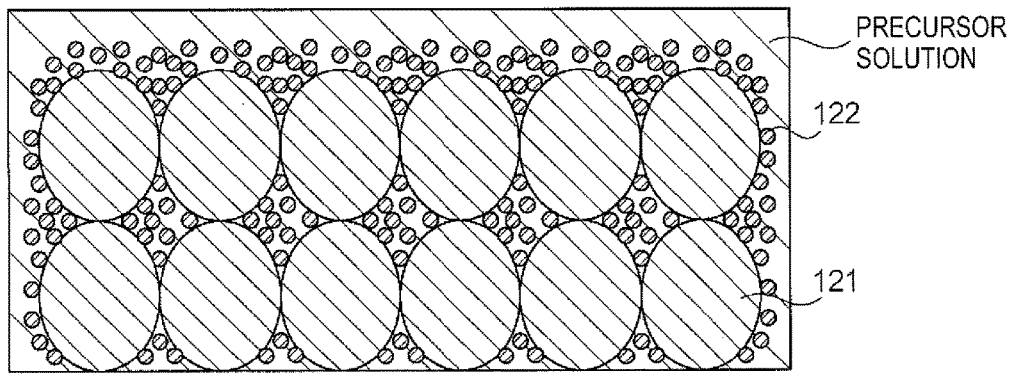
FIG. 5 is a schematic view showing a state after Step S3.

In Step S3, a precursor solution of the solid electrolyte 123 is impregnated with the voids of the assembly of the active material compacts 121 and the solid electrolytes 122 (FIG. 5). As the solid electrolyte 123, a material which is a solid (amorphous) at a room temperature and of which the volume when firing the precursor is contracted less than that of the solid electrolyte 122 is used. The solid electrolyte 123 is preferably formed at the same temperature as or a lower temperature than that of the solid electrolyte 122. This is for suppressing mutual diffusion between the solid electrolyte 122 and the solid electrolyte 123. For example, a case of using $Li_{0.35}La_{0.55}TiO_3$ as the solid electrolyte 122 and $Li_2SiO_3$ as the solid electrolyte 123 is considered. In this case, the firing temperature in Step S2 is approximately 700° C. However, when the formation temperature of the solid electrolyte 123 in Step S4 which will be described later exceeds 800° C., the mutual diffusion between the solid electrolyte 122 and the solid electrolyte 123 occurs. As the precursor of the solid electrolyte 123, any one of (A) to (C) may be used, in the same manner as in the precursor of the solid electrolyte 122. This is diluted with a solvent (for example, an alcohol compound) to be used as a precursor solution. This precursor solution is impregnated with the voids of the assembly of the active material compacts 121 and the solid electrolytes 122. A method of impregnating the precursor solution is the same as that described regarding the solid electrolyte 122.

Figure 6:
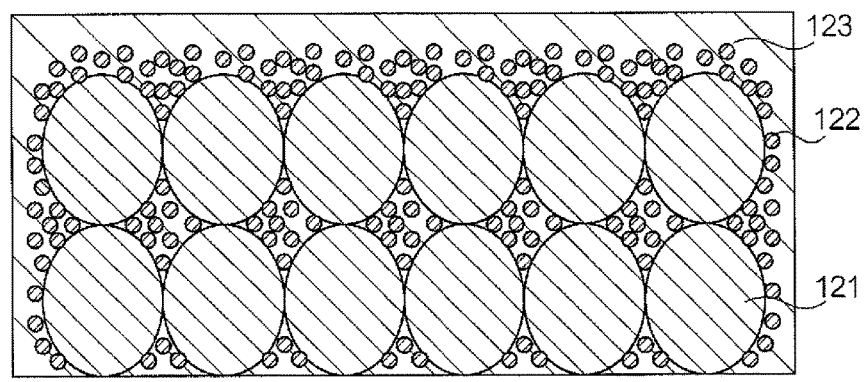
FIG. 6 is a schematic view showing a state after Step S4.

In Step S4, the assembly where the precursor solution is impregnated is subjected to the heat treatment and the solid electrolyte 123 is obtained (FIG. 6). The heat treatment is performed for drying the solvent of the precursor solution. The heat treatment is performed at a temperature in a temperature range of 300° C. to 450° C., for example. By doing so, the assembly 12 is obtained.

In Step S5, the collector 11 is formed on the assembly 12 and the electrode assembly 1 is obtained. Specifically, first, the surface of the assembly 12 is polished. The collector 11 formed in advance is bonded to this polished surface. Alternatively, a film of the collector 11 may be formed on the assembly 12 using a well-known process. As the film forming process, physical vapor deposition (PVD) or chemical vapor deposition (CVD), for example, is used.

The active material compact 2 may be exposed to the surface which comes in contact with the loaded surface of the assembly 4 when the assembly 4 is formed. In this case, it is possible to bond the collector 11 and the active material compact 2 to each other without polishing the assembly 4.

3. Examples

3-1. Structure of Sample

3-1-1. Experimental Example 1

In this example, $LiCoO_2$ was used as a material of the active material compact 121, $Li_{0.35}La_{0.55}TiO_2$ was used as a material of the solid electrolyte 122, and $Li_2SiO_3$ was used as a material of the solid electrolyte 123, respectively.

First, the active material compact 121 was formed (Step S1). Specifically, 100 parts by mass of $LiCoO_2$ powder (manufactured by Sigma-Aldrich Co., LLC.) and 3 parts by mass of polyacrylic acid (PAA) powder (manufactured by Sigma-Aldrich Co. LLC.) were mixed with each other while being ground with a mortar. 80 mg of the mixed powder was put in a die having a size of 10 mmϕ and pressurized, to be molded in a disc-shaped pellet. The molded pellet was subjected to the heat treatment and sintered at 1000° C. for 8 hours in an aluminum crucible having $LiCoO_2$ powder on the bottom. In the heat treatment, the porous active material compact was manufactured by setting a temperature rise rate as 3° C./min and a temperature fall rate as 3° C./min up to 500° C. A thickness of the obtained active material compact was approximately 300 μm.

Next, the solid electrolyte 122 was formed (Step S2). First, the precursor solution was prepared in order to form the solid electrolyte 122. Specifically, 0.799 g of amorphous titania powder (manufactured by Sigma-Aldrich Co. LLC.) was dissolved in 35 mL of a 30% $H_2O_2$ aqueous solution. 9 mL of 35% $NH_3$ aqueous solution was added to the obtained aqueous solution and was left for 1 hour while performing water-cooling. 2.10 g of citric acid monohydrate (manufactured by Kanto Chemical Co., Inc.) was added to the obtained aqueous solution and was stirred while being heated at 60° C. for 30 minutes. The obtained aqueous solution was evaporated to dryness and pure water was added and dissolved in the precipitated solid. Accordingly, an aqueous solution of titanium ammonium salt peroxo citrate (hereinafter, referred to as a Ti-CA aqueous solution) which is a pale yellow solution was obtained. The Ti-CA aqueous solution was prepared at 0.5 mol/kg. In this case, pH was 6 to 7. $LiNO_3$ (manufactured by Kanto Chemical Co., Inc.) and $La(NO_3)_3 \cdot 6H_2O$ (manufactured by Kanto Chemical Co., Inc.) were added to the Ti-CA aqueous solution so that the metal atoms are contained at a composition ratio according to a composition formula of $Li_{0.35}La_{0.55}TiO_3$. The metal salt is dissolved by adding citric acid monohydrate, the 35% $NH_3$ aqueous solution was added, and a precursor solution containing the precursor of 0.5 mol/kg was prepared with the conversion of the Ti composition ratio of $Li_{0.35}La_{0.55}TiO_3$. pH was 6 to 7.

The precursor solution was impregnated with the active material compact, dried at 60° C., heated to 200° C., and the precursor was adhered to the active material compact. The operations from the impregnating of the liquid with the active material compact to the heating at 200° C. were repeated until the mass of the precursor adhered to the active material compact reaches 15 mg which is the set amount. After the set amount of the precursor is adhered to the active material compact, the entirety thereof was heated and fired at 700° C.

Next, the solid electrolyte 123 was formed. First, the precursor solution was prepared in order to form the solid electrolyte 123. Specifically, an n-decane acid solution (0.2 mol/kg) of $Li(OCOC_{17}H_{35})_2$ (lithium stearate) and a p-xylene solution (1.0 mol/kg) of PDMS (polydimethylsiloxane) was mixed with each other. In addition, a small amount of n-octane was added as a buffer solvent of the n-decane acid solution and the p-xylene solution. By doing so, the precursor solution was prepared.

The precursor was impregnated with the assembly of the active material compact 121 and the solid electrolyte 122 (Step S3) and was dried. After the drying, the assembly where the precursor solution is impregnated was subjected to the heat treatment at 300° C. (Step S4). When the assembly is heated at 300° C., $Li_2SiO_3$ was melted and the entire assembly became wet. After the melting, several minutes later, the melted $Li_2SiO_3$ was impregnated with the assembly.

In Experimental Example 1, $Li_2SiO_3$ was used as the solid electrolyte 122, but instead of or in addition to $Li_2SiO_3$, $Li_6SiO_5$ may be used. In a case of using $Li_6SiO_5$, the heat treatment is performed at 400° C.

3-1-2. Experimental Example 2

A sample was prepared in the same manner as in Experimental Example 1, except for performing the heat treatment in Step S4 at 600° C.

3-1-3. Experimental Example 3

The solid electrolyte 122 was only formed on the active material compact 121, without forming the solid electrolyte 123 (Steps S3 and S4). A sample was prepared in the same manner as in Experimental Example 1, except for this.

3-2. Evaluation of Samples

An evaluation of charge-discharge behaviors was performed regarding Experimental Examples 1 to 3. In the samples of Experimental Examples 1 to 3, aluminum was used as the positive electrode and lithium and copper was used as the negative electrode, respectively. For the positive electrode, an aluminum plate was bonded to the polished surface to form the electrode. For the negative electrode, first, a lithium-proof layer was formed. The lithium-proof layer was formed by applying and drying a liquid composition formed of polymethylmethacrylate (PMMA) (manufactured by Soken Chemical Engineering Co., Ltd.), $LiCoO_2$, ethylene carbonate (manufactured by Sigma-Aldrich Co. LLC.), and dimethyl carbonate (manufactured by Sigma-Aldrich Co. LLC.). The lithium metal foil and copper foil were stacked in the order from the lithium-proof layer and were compressed to form the negative electrode. The evaluation of the charge-discharge behaviors was performed with respect to the samples obtained as described above.

The charge-discharge behaviors were measured using a multi-channel charge-discharge evaluation device (HJ1001SD8 manufactured by Hokuto Denko Corporation). The measurement was performed in the conditions with current density of 0.1 mA/cm, constant current-constant voltage having a charging upper limit voltage of 4.2V, and constant current driving with a discharge lower limit voltage of 3.0 V.

Figure 7:
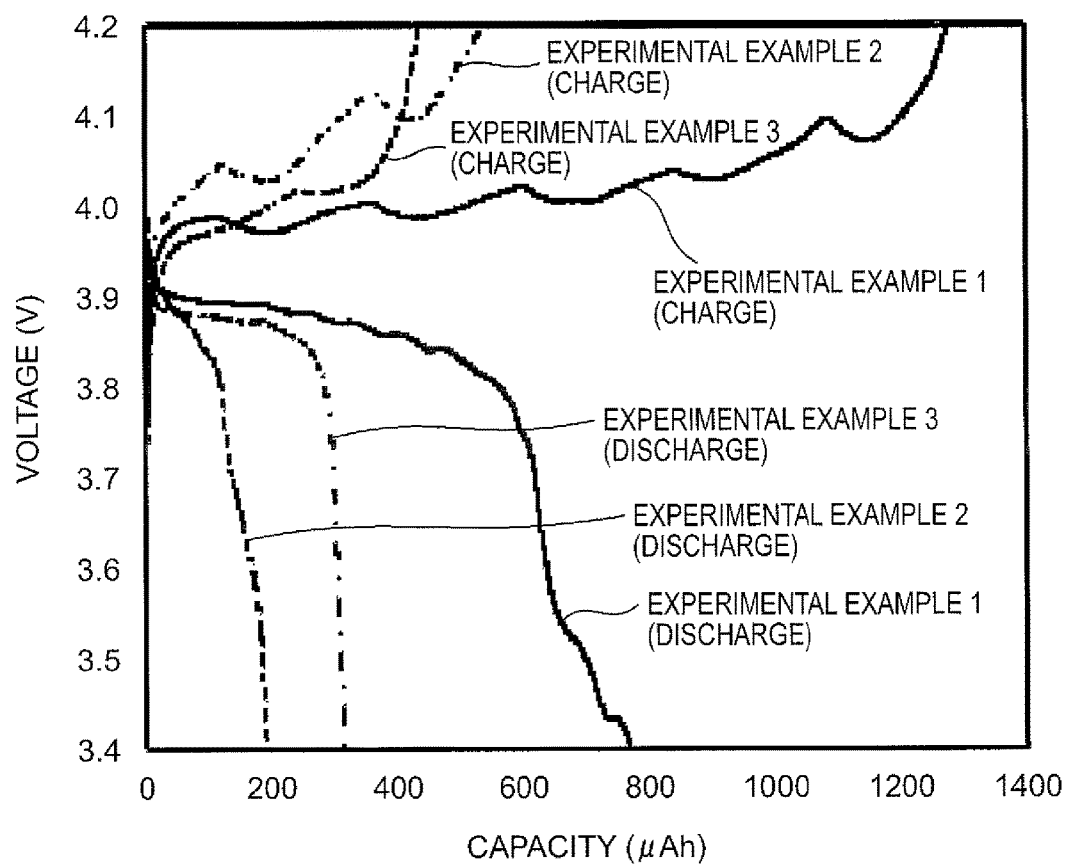
FIG. 7 is a view showing charge-discharge behaviors of experimental examples 1 to 3.

FIG. 7 is a view showing the charge-discharge behaviors of Experimental Examples 1 to 3. When Experimental Example 1 and Experimental Example 3 are compared to each other, Experimental Example 1 shows the excellent charge-discharge behaviors. That is, the charge-discharge behaviors are improved by using the structure containing the solid electrolyte 123. When Experimental Example 2, Experimental Example 1, and Experimental Example 3 are compared to each other, the charge-discharge behaviors of Experimental Example 2 are deteriorated. In Experimental Example 2, a balanced voltage at the time of charging is higher than that in Experimental Example 1 and Experimental Example 3, and thus it is assumed that the crystallization of $Li_2SiO_3$ proceeds to realize high resistance.

What is claimed is:

1. A manufacturing method of an electrode assembly comprising:
    forming an active material compact having a plurality of voids;
    impregnating the active material compact with a first solid electrolyte precursor;
    forming a first assembly by performing heat treatment for the active material compact with which the first solid electrolyte precursor is impregnated;
    impregnating the first assembly with a second solid electrolyte precursor; and
    forming a second assembly by performing heat treatment for the first assembly with which the second solid electrolyte precursor is impregnated,
    wherein the second solid electrolyte precursor is amorphous at a room temperature, and
    a temperature of the heat treatment in the forming of the second assembly is lower than a temperature of the heat treatment in the forming of the first assembly.

2. The manufacturing method of an electrode assembly according to claim 1,
    wherein the active material compact is formed from a material comprising a lithium double oxide,
    the second solid electrolyte precursor comprises a material conducting lithium ions, and
    the first assembly is not dissolved in the forming of the second assembly.

3. The manufacturing method of an electrode assembly according to claim 1,
    wherein a temperature of the heat treatment in the forming of the second assembly is in a range of 300° C. to 450° C.

4. The manufacturing method of an electrode assembly according to claim 1,
    wherein a solid electrolyte formed from the second solid electrolyte precursor comprises a lithium double oxide comprising Si or B.

5. The manufacturing method of an electrode assembly according to claim 4,
    wherein a solid electrolyte formed from the second solid electrolyte precursor comprises at least one of $Li_2SiO_3$ and $Li_6SiO_5$.

6. The manufacturing method of an electrode assembly according to claim 1,
    wherein the active material compact comprises $LiCoO_2$.

7. The manufacturing method of an electrode assembly according to claim 1,
    wherein a solid electrolyte formed from the first solid electrolyte precursor comprises $Li_{0.35}La_{0.55}TiO_3$.

8. An electrode assembly comprising:
    an active material compact;
    a first solid electrolyte; and
    a second amorphous solid electrolyte which is different from the first solid electrolyte,
    wherein the active material compact includes a plurality of voids,
    the first solid electrolyte is formed in the plurality of voids, and at least a part of the first solid electrolyte is in direct contact with the active material compact, and
    the second amorphous solid electrolyte is formed in voids of the assembly of the active material compact and the solid electrolyte.

9. The electrode assembly according to claim 8,
    wherein a porosity of the active material compact is from 10% to 50%.

10. The electrode assembly according to claim 8,
    wherein the active material compact comprises lithium double oxide, and
    the second solid electrolyte conducts lithium ions.

11. The electrode assembly according to claim 8,
    wherein the second amorphous electrolyte is formed of a lithium double oxide comprising Si or B.

12. The electrode assembly according to claim 8,
    wherein the second amorphous solid electrolyte comprises at least one of $Li_2SiO_3$ and $Li_6SiO_5$.

13. The electrode assembly according to claim 8,
    wherein the active material compact comprises $LiCoO_2$.

14. The electrode assembly according to claim 8,
    wherein the first solid electrolyte comprises $Li_{0.35}La_{0.55}TiO_3$.

15. A battery comprising:
    the electrode assembly according to claim 8.

* * * * *